(12) United States Patent
Bisnack

(10) Patent No.: US 7,954,985 B2
(45) Date of Patent: Jun. 7, 2011

(54) REARVIEW MIRROR ASSEMBLY INCLUDING OPTICAL FIBER SIGNALING

(75) Inventor: William C. Bisnack, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 276 days.

(21) Appl. No.: 12/352,184

(22) Filed: Jan. 12, 2009

(65) Prior Publication Data
US 2010/0177523 A1 Jul. 15, 2010

(51) Int. Cl.
*B60Q 1/26* (2006.01)
*B60R 1/12* (2006.01)

(52) U.S. Cl. ........................... 362/494; 362/541

(58) Field of Classification Search .................. 362/494, 362/511, 540, 541, 542
See application file for complete search history.

(56) References Cited

U.S. PATENT DOCUMENTS

| | | | |
|---|---|---|---|
| 3,761,706 A * | 9/1973 | Frey | 362/505 |
| 6,005,724 A | 12/1999 | Todd | |
| 7,427,150 B2 | 9/2008 | Carter et al. | |
| 2009/0161378 A1* | 6/2009 | Enz | 362/511 |

* cited by examiner

*Primary Examiner* — David V Bruce
(74) *Attorney, Agent, or Firm* — Ingrassia Fisher & Lorenz, P.C.

(57) ABSTRACT

A rearview mirror assembly for use on a vehicle, comprises a housing configured to be coupled to the vehicle, a mirror coupled within the housing, and a first optical fiber coupled to the housing and visible from the exterior thereof for providing a warning that indicates that the vehicle is turning, braking, and the like.

20 Claims, 3 Drawing Sheets

REARVIEW MIRROR ASSEMBLY INCLUDING OPTICAL FIBER SIGNALING

TECHNICAL FIELD

This invention relates generally to vehicular rearview mirror assemblies, and more particularly relates to an exterior rearview mirror assembly incorporating optical fibers for generating warning signals.

BACKGROUND OF THE INVENTION

It is known to provide warning signal light modules on or within the housing of an exterior rearview mirror. This typically involves the placement of light sources (e.g. light emitting diodes) behind the mirror surface, often arranges in a shape indicative of the intended warning. For example, on a left-side exterior rearview mirror, light sources may be arranged behind the mirror surface to form an arrow pointing left that is illuminated to indicate that the driver intends to make a left turn. A similar light assembly would be provided on the right-side exterior rearview mirror to warn of an intended right turn. Other light sources within the mirror assembly may be configured such that when illuminated, a warning is given to rearward drivers of a forward driver's intention to slow down or stop. Still other light sources, or perhaps even some of the same ones, may be utilized to form a blind zone alert (BZA) that warns the driver of a vehicle that another vehicle is in his or her blind spot. As is well known, different colors may be associated with different warnings. For example, the turn and BZA warnings may be amber, and the brake signal may be red.

To render the signals more vivid, it is known to form discrete apertures in the mirror coatings as, for example, by laser ablation, chemical mechanical polishing, or other known techniques. Light sources are then positioned within the mirror housing so as to transmit light through the apertures to form a desired pattern (e.g. a turn-signal arrow). Such techniques, however, are complex thus increasing the cost of manufacture and ultimately, the price of the vehicle.

It would therefore be desirable to provide a vehicular rearview mirror assembly that is simpler and less costly to manufacture. Other desirable features and characteristics will become apparent from the following detailed description and the appended claims, taken in conjunction with the accompanying drawings and the foregoing technical field and background.

SUMMARY OF THE INVENTION

A rearview mirror assembly, for use on a vehicle, comprises a housing configured to be coupled to the vehicle. A mirror is coupled within the housing, and an optical fiber is coupled to the housing and visible from the exterior of the rearview mirror assembly for providing a warning when illuminated.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-5 are merely illustrative and may not be drawn to scale.

Figure 1:
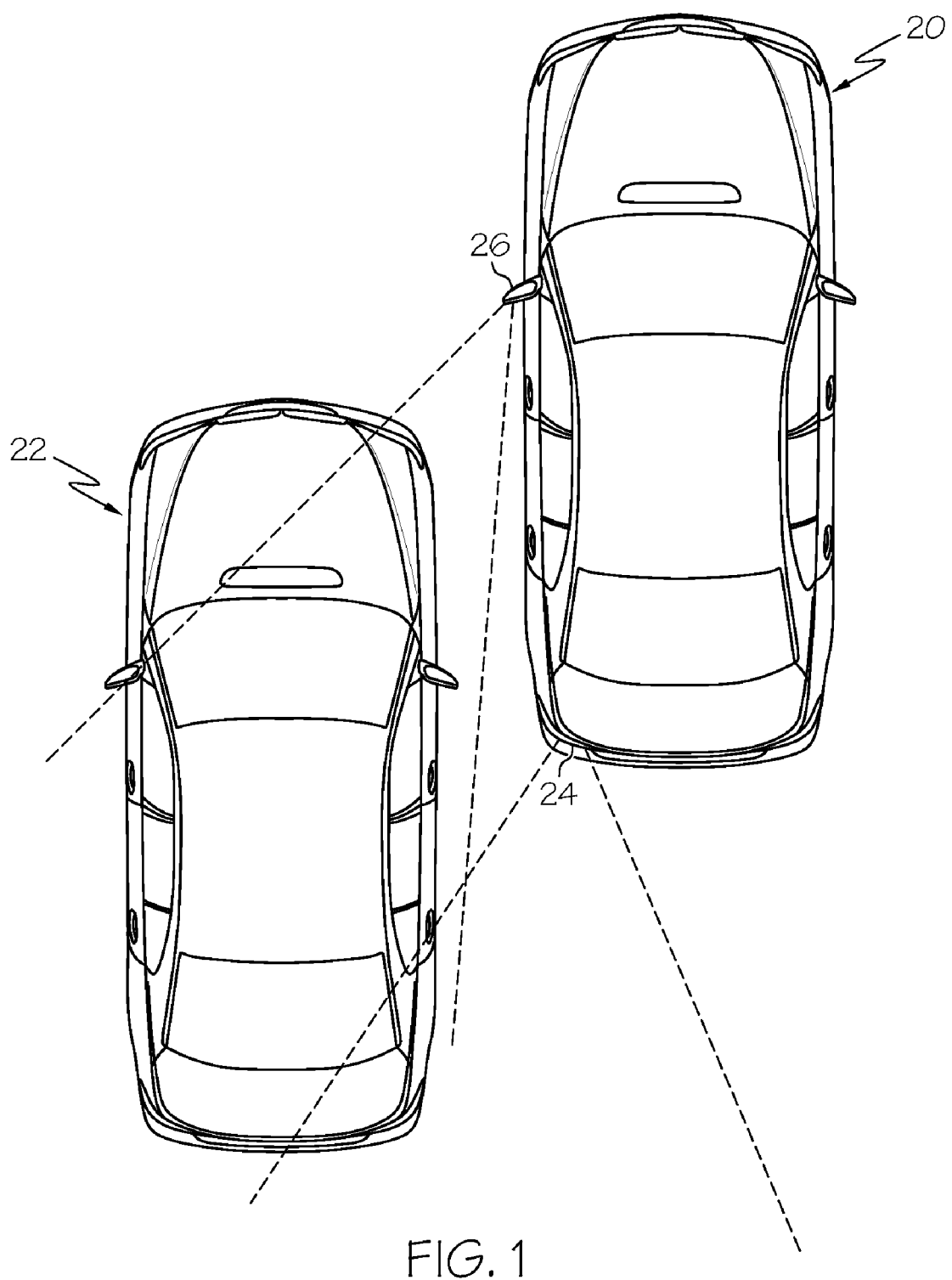
FIG. 1 is a top view of two vehicles in adjacent driving lanes for illustrating the leading driver's blind zone.

FIG. 1 illustrates first and second vehicles 20 and 22 respectively, operating in adjacent lanes. Vehicle 20 is leading vehicle 22 by a distance that positions vehicle 22 in the blind zone of the driver of vehicle 20. In addition, rear turn signal 24 may not be visible to the driver of vehicle 22. Thus the driver of vehicle 22 might not be aware of the intention of the driver of vehicle 20 to change lanes. As will be described below, rearview mirror assembly 26 is provided with a fiber optic signaling mechanism that is configured to warn the driver of vehicle 20 that a vehicle 22 is in his blind zone. Furthermore, rearview mirror assembly 26 is provided with a fiber optic turn signal.

Figure 2:
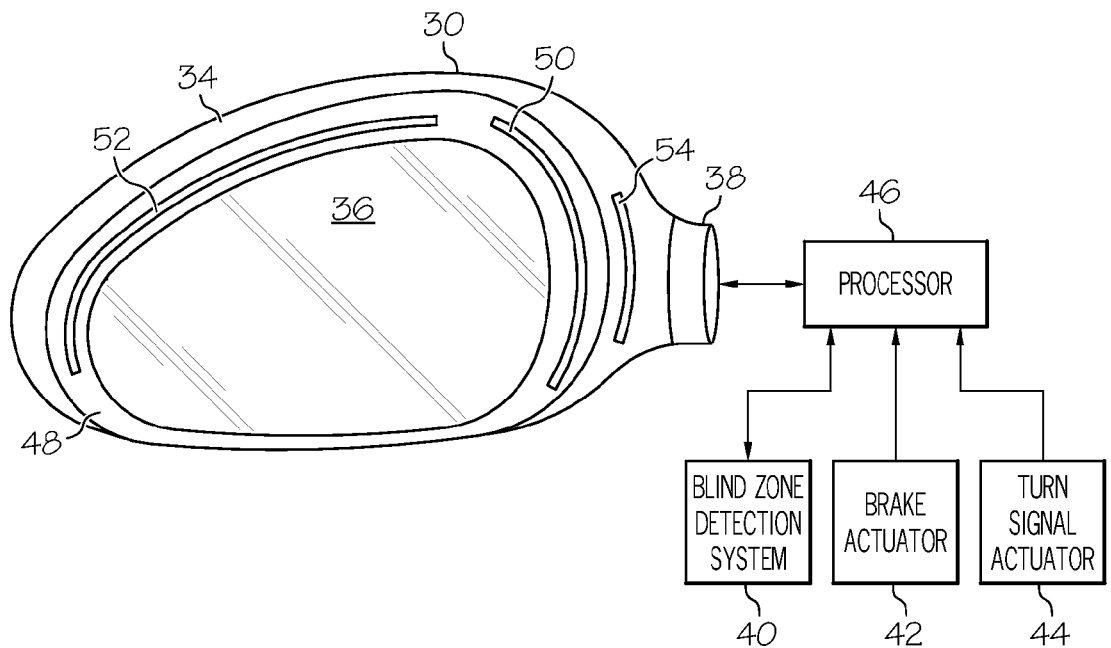
FIG. 2 is a partial block/partial isometric view of a rearview mirror system in accordance with a first embodiment.

FIG. 2 is a partial block/partial isometric diagram of an exterior rearview mirror assembly 30 in accordance with a first embodiment. Rearview mirror assembly 30 comprises a housing 34, a mirror assembly 36, a mounting bracket 38 for coupling the mirror 30 to a vehicle (20 in FIG. 1), and optionally, a bezel 48 that forms a complete enclosure with housing 34. The rearview mirror communicates with a blind zone detection system 40, a brake actuator 42, and a turn signal actuator 44, each of which has outputs coupled to processor 46, for example, the vehicle's body control module (BCM). In turn, processor communicates with and controls rearview mirror assembly 30. Processor 46 may receive other inputs, for controlling the position of the mirror, heating the mirror surface, reducing glare, etc. customarily provided on some late model vehicles bur not shown here.

Housing 34 is typically a contoured enclosure suitable for housing mirror 36 and components related to mirror operation and features. Mirror 36 may be of any well known type and typically comprises a glass or polymer having a reflective coating thereon such as chrome, silver, or the like. If desired, a camera or other form of vehicle detection device (e.g. radar) may be mounted in housing 34 for the purpose of detecting the presence of a vehicle in a driver's blind zone and alerting the driver as will be more fully described below. Optional bezel 48 is configured to fit over and circumscribe the perimeter of mirror 36 and is shaped to be secured to the periphery of housing 34.

Mirror assembly 30 further comprises at least one optical fiber (or optical fiber cable comprised of a plurality of optical fibers bundled together) and/or at least one light pipe. As used herein, the term "optical fiber" is intended to include any such optical fiber, optical fiber cable, or light pipe assembly.

In the embodiment shown in FIG. 2, three such optical fibers 50, 52, and 54 are shown. As can be seen, optical fibers 50 and 52 are coupled to bezel 48, and optical fiber 54 is coupled to housing 34 proximate mounting bracket 38. However, it should be clear that the optical fibers may be attached to the mirror assembly in a variety of qualities, combination, and/or orientations, examples of which will be shown below. Further, the optical fibers may be coupled to the mirror assembly using a variety of well known techniques. For example, the fibers may be attached to the housing, edge of the mirror and/or bezel using an adhesive or the fibers may be co-molded with the bezel and/or housing. Each of the fibers may be configured to provide different types of warnings. For example, optical fiber 50 may operate as a turn signal under the control of turn signal actuator 44 and processor 46. Similarly, when the vehicle's brakes are applied, brake actuator 42 sends an activation signal to processor 46 that, in turn, causes optical fiber 52 to be illuminated, and/or flash in unison with the other vehicular turn signal lamps. Optical fiber 54 may be illuminated by blind zone detection system via processor 46 when a vehicle is detected in the driver's blind zone by, for example, a camera (not shown) mounted in housing 34. As will be described below, each of optical fibers 50, 52, and 54 may be illuminated with light of different colors. By way of example, optical fiber 52 may glow the traditional brake-light red. Fiber 50 may be configured to emit green light, and fiber 54 amber light.

It should be clear that the arrangement of optical fibers shown in FIG. 2 and the respective colors assigned thereto are given by way of example only and other configurations are contemplated. For example, the configuration shown in FIG. 3 includes a brake light fiber 56 in the mirror case along the edge of mirror 36, a turn signal light pipe 58 adjacent bezel 48, and light pipes 60 adjacent the mounting bracket 38. Further, FIG. 4 illustrates how optical fibers 62 may be incorporated in the front of housing 34 (e.g. turn signals) so as to be visible from the front of the vehicle.

Figure 3:
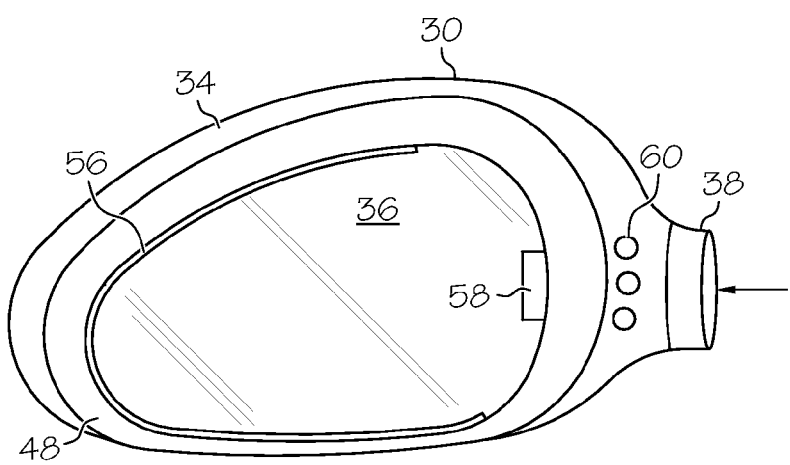
FIG. 3 is an isometric view of a rearview mirror assembly in accordance with a further embodiment.
Figure 4:
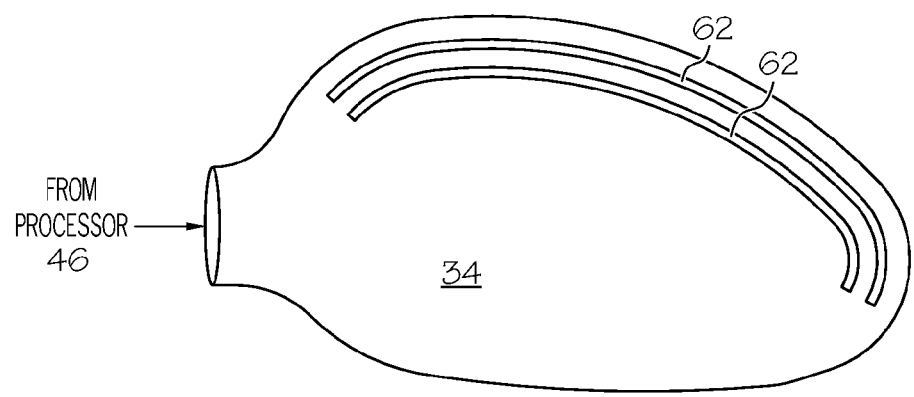
FIG. 4 is an isometric view of a rearview mirror assembly in accordance with a still further embodiment.
Figure 5:
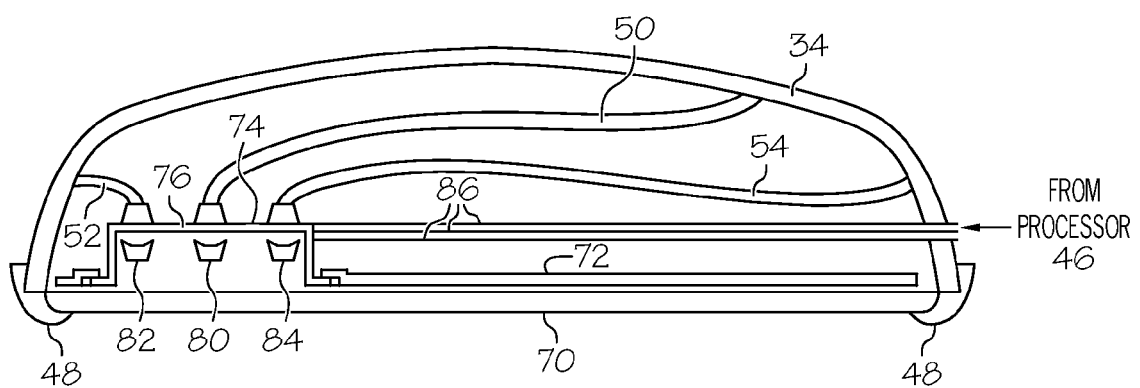
FIG. 5 is a cross-sectional view of the mirror assembly shown in FIGS. 2, 3, and 4.

FIG. 5 is a cross-sectional view of the mirror assembly shown in FIGS. 2, 3, and 4. As can be seen, a mirror substrate assembly 70 including a reflective surface is secured to housing 34 by means of bezel 48; although as stated previously, other means of securing mirror substrate 70 to housing 34 without a bezel are known. A carrier assembly 72 supports mirror substrate 70. In addition, carrier assembly 72 positions and secures a printed circuit board light assembly 76 that includes light sources (e.g. light emitting diodes) 80, 82, and 84. Light sources 80, 82, and 84 may be selected to generate green, red and amber light respectively. Alternatively light sources 80, 82, and 84 may generate white light, and fibers 50, 52, and 54 are configured to transmit the desired color. The ends of fibers 50, 52, and 54 are mounted proximate light sources 80, 82, and 84 respectively; i.e. through apertures in printed circuit board 74. Additionally, the light sources 80, 82, and 84 could be mounted in a variety of locations, such as within the housing 34, or in the mounting bracket 38, and/or within the vehicle's door, depending on cost, styling, or serviceability considerations.

When, for example, the vehicle's brake pedal is depressed, brake actuator 42 (FIG. 2) causes processor 46 to energize light source 82 via control line 86 and printed circuit board 74 causing brake light fiber 52 to illuminate. Similarly, light sources 80 and 84 are illuminated via turn signal actuator 44 (FIG. 2) and blind zone detector system 40 respectively, thus illuminating optical fibers 50 and 54 respectively.

In addition to serving as a warning to other drivers, optical fiber bundles could be configured to function as a "puddle lamp" (i.e. a lamp that illuminates the area around the vehicle's door) when someone approaches the vehicle and activates their key fob to remotely activate the doors.

The above description is given by way of example only. Changes in form and details may be made by one skilled in the art without departing from the scope of the invention. Light source when the function actuator is activated thereby illuminating (e.g. flashing) the optical fiber to provide a warning.

What is claimed is:

1. A rearview mirror assembly for use on a vehicle, comprising:
    a housing configured to be coupled to the vehicle;
    a mirror coupled within the housing;
    a first optical fiber coupled to the housing and visible from the exterior thereof for providing a warning when illuminated; and
    a processor coupled to the first optical fiber for controlling the illumination of the first optical fiber.

2. A rearview mirror assembly according to claim 1 wherein the vehicle includes a brake actuator and wherein the rearview mirror assembly further comprises a first light source within the housing and coupled to the brake actuator for illuminating the first optical fiber.

3. A rearview mirror assembly according to claim 2 further comprising a second optical fiber coupled to the housing and visible from the exterior thereof for providing a turn signal.

4. A rearview mirror assembly according to claim 3 further comprising a third optical fiber coupled to the housing and visible for providing blind zone detection warning.

5. A rearview mirror assembly according to claim 4 wherein the vehicle includes a turn signal actuator and wherein the rearview mirror assembly further comprises a second light source coupled to the turn signal actuator for illuminating the second optical fiber.

6. A rearview mirror assembly according to claim 5 wherein the vehicle includes a blind zone detection and wherein the rearview mirror assembly further comprises a third light source coupled to blind zone detection system for illuminating the third optical fiber.

7. A rearview mirror assembly according to claim 6 wherein each of the first, second, and third light sources provide light of a different color.

8. A rearview mirror assembly according to claim 7 further comprises a bezel for securing the mirror to the housing.

9. A rearview mirror assembly according to claim 8 wherein the first optical fiber is at least partially integral with the housing.

10. A rearview mirror assembly according to claim 8 wherein the first optical fiber is at least partially integral with the bezel.

11. A rearview mirror assembly according to claim 9 wherein the first optical fiber is positioned to be visible from the front of the vehicle.

12. A rearview mirror assembly according to claim 1 wherein the housing includes a mounting bracket and wherein the first optical fiber is visible from the exterior of the mounting bracket.

13. A rearview mirror assembly according to claim 6 wherein the processor has an input coupled to the brake actuator and an output coupled to the first light source, the processor configured to control the first light source.

14. A rearview mirror assembly according to claim 6 wherein the processor has an input coupled to the turn signal actuator and an output coupled to the second light source, the processor configured to control the second light source.

15. A rearview mirror assembly according to claim 6 wherein the processor has an input coupled to the blind zone detection system and an output coupled to the third light source, the processor configured to control the third light source.

16. A rearview mirror assembly for use on a vehicle having a turn signal actuator, the vehicle comprising:
   a housing configured to be coupled to the vehicle;
   a mirror coupled within the housing;
   a first light source;
   a first optical fiber coupled to the housing and visible from the exterior of the vehicle, the first optical fiber having an end positioned proximate the first light source; and
   a processor coupled to the turn signal actuator and to the first light source for illuminating the fiber when the turn signal actuator is activated.

17. A rearview mirror assembly according to claim 16 wherein the first optical fiber is coupled to the exterior of the housing.

18. A rearview mirror assembly according to claim 16 wherein the housing includes a bezel and wherein the first optical fiber is coupled to the exterior of the bezel.

19. A rearview mirror assembly according to claim 16 wherein the housing includes a mounting bracket and wherein the first optical fiber is coupled to the exterior of the mounting bracket.

20. A rearview mirror assembly for use on a vehicle having a function actuator, the assembly comprising:
   a housing configured to be coupled to the vehicle;
   a mirror assembly coupled to the housing;
   a light source;
   an optical fiber coupled to the exterior of the housing having a first end positioned proximate the light source; and
   a processor having an output coupled to the light source and having an input coupled to the function actuator, the processor configured to illuminate the optical fiber.

* * * * *